(12) United States Patent
Brown et al.

(10) Patent No.: US 10,195,566 B2
(45) Date of Patent: Feb. 5, 2019

(54) OXIDATION CATALYST

(71) Applicant: Johnson Matthey Public Limited Company, London (GB)

(72) Inventors: Gavin Michael Brown, Royston (GB); Andrew Francis Chiffey, Royston (GB); Jonathan David Radcliffe, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/338,596

(22) Filed: Oct. 31, 2016

(65) Prior Publication Data

US 2017/0120192 A1 May 4, 2017

(30) Foreign Application Priority Data

Nov. 2, 2015 (GB) .................................. 1519335.2

(51) Int. Cl.
*B01D 53/94* (2006.01)
*B01J 21/04* (2006.01)
(Continued)

(52) U.S. Cl.
CPC ....... *B01D 53/944* (2013.01); *B01D 53/9472* (2013.01); *B01D 53/9477* (2013.01); *B01J 21/10* (2013.01); *B01J 23/40* (2013.01); *B01J 35/04* (2013.01); *B01J 35/1014* (2013.01); *B01J 35/1019* (2013.01); *B01J 37/0244* (2013.01); *F01N 3/035* (2013.01); *F01N 3/0842* (2013.01); *F01N 3/106* (2013.01); *F01N 3/2066* (2013.01);
(Continued)

(58) Field of Classification Search
CPC . B01J 21/04; B01J 21/10; B01J 23/005; B01J 23/02; B01J 23/40; B01J 23/42; B01J 23/44; B01J 23/46; B01J 23/56; B01J 23/58; B01J 35/04; B01J 35/1019; B01J 37/0244; B01D 53/944; B01D 53/9472; B01D 53/9477; F01N 3/035; F01N 3/0842; F01N 3/106; F01N 3/2066
See application file for complete search history.

(56) References Cited

U.S. PATENT DOCUMENTS 4,049,582 A * 9/1977 Erickson .............. B01D 53/945
502/306
4,239,656 A * 12/1980 Fujitani ................ B01D 53/945
423/213.5
(Continued)

FOREIGN PATENT DOCUMENTS

EP 1355048 A1 10/2003
GB 2481057 A 12/2011
(Continued)

*Primary Examiner* — Cam N. Nguyen
(74) *Attorney, Agent, or Firm* — Gary D. Mangels

(57) ABSTRACT

A catalysed soot filter comprises an oxidation catalyst for oxidizing NO to $NO_2$ and/or oxidizing CO to $CO_2$ and/or HC to $CO_2$ and $H_2O$ disposed on a wall flow filter monolithic substrate, the oxidation catalyst comprising: a platinum group metal component, and a pre-calcined support material comprising a mixed magnesium aluminium metal oxide having a magnesium content, calculated as Mg, of 15 wt % Mg or lower.

21 Claims, 2 Drawing Sheets

(51) Int. Cl.
*B01J 21/10* (2006.01)
*B01J 23/00* (2006.01)
*B01J 23/02* (2006.01)
*B01J 23/40* (2006.01)
*B01J 23/42* (2006.01)
*B01J 23/44* (2006.01)
*B01J 23/46* (2006.01)
*B01J 23/56* (2006.01)
*B01J 23/58* (2006.01)
*B01J 35/04* (2006.01)
*B01J 35/10* (2006.01)
*B01J 37/02* (2006.01)
*F01N 3/035* (2006.01)
*F01N 3/08* (2006.01)
*F01N 3/10* (2006.01)
*F01N 3/20* (2006.01)

(52) U.S. Cl.
CPC .............. *B01D 2255/1021* (2013.01); *B01D 2255/1023* (2013.01); *B01D 2255/1025* (2013.01); *B01D 2255/2047* (2013.01); *B01D 2255/2092* (2013.01); *B01D 2255/9032* (2013.01); *B01D 2255/9155* (2013.01); *B01D 2255/9207* (2013.01); *B01D 2258/012* (2013.01); *B01J 23/58* (2013.01); *B01J 37/0215* (2013.01); *F01N 2330/06* (2013.01); *F01N 2370/04* (2013.01); *F01N 2510/0682* (2013.01); *F01N 2900/1602* (2013.01); *Y02A 50/2325* (2018.01); *Y02T 10/24* (2013.01)

(56) References Cited

U.S. PATENT DOCUMENTS

| | | | |
|---|---|---|---|
| 4,261,862 A * | 4/1981 | Kinoshita | B01D 53/945 423/213.5 |
| 4,985,387 A * | 1/1991 | Prigent | B01D 53/945 423/213.5 |
| 5,956,263 A | 9/1999 | Narita et al. | |
| 6,372,688 B1 * | 4/2002 | Yamashita | B01D 53/945 502/326 |
| 7,351,382 B2 | 4/2008 | Pfeifer et al. | |
| 7,465,690 B2 * | 12/2008 | Yan | B01D 53/944 422/177 |
| 9,034,286 B2 * | 5/2015 | Bergeal | B01D 53/945 422/180 |
| 2003/0125202 A1 | 7/2003 | Ruwisch et al. | |
| 2004/0013606 A1 | 1/2004 | Tonkovich et al. | |
| 2012/0055141 A1 | 3/2012 | Hilgendorff | |
| 2014/0140911 A1 | 5/2014 | Bergeal et al. | |

FOREIGN PATENT DOCUMENTS

| | | |
|---|---|---|
| GB | 2520776 A | 6/2015 |
| WO | 2014080200 A1 | 5/2014 |
| WO | 2014080202 A1 | 5/2014 |

* cited by examiner

OXIDATION CATALYST

CROSS-REFERENCE TO RELATED APPLICATIONS

This application claims priority to Great Britain Application No. 1519335.2, filed Nov. 2, 2015, which is incorporated herein by reference.

The present invention relates to catalytic monoliths comprising oxidation catalysts, to exhaust systems for internal combustion engines, preferably compression ignition engines, to vehicles comprising internal combustion engines and such exhaust systems, to methods for treating exhaust gases from internal combustion engines and to methods for making catalytic monoliths.

Internal combustion engines are a potential source of pollutants. Increasingly strict environmental regulations have been enacted throughout the world including the European Union and the USA to reduce the emission of pollutants into the atmosphere from various sources, in particular, internal combustion (IC) engines. There have been a number of solutions proposed to the problem of reducing emissions from IC engines.

There are four general classes of pollutant that need to be reduced in engine exhaust gases: carbon monoxide (CO), unburned hydrocarbons (HCs), oxides of nitrogen ($NO_x$) and particulate matter (PM) often comprising carbon soot. Legislative standards for permissible emission of pollutants in exhaust gases from vehicles are gradually becoming more stringent. There is a need, therefore, to provide improved catalysts that are able to meet these standards and which are cost-effective.

There are often a number of separate catalytic components used in exhaust systems to reduce pollutants. Each component may reduce a pollutant directly, some components produce products which may form reactants for later (downstream) components.

So, for example, an upstream component may comprise a honeycomb flow through monolithic substrate coated with an oxidation catalyst; and a downstream component may comprise a honeycomb flow through monolithic substrate coated with a SCR catalyst.

GB-A-2 481 057 discloses a method of treating nitrogen oxide, particulate matter or both using a catalyst comprising manganese oxide and at least one platinum group metal.

For compression ignition engines, such as diesel engines, one catalytic component often used is a catalysed soot filter (CSF). CSFs usually catalyse the oxidation of (1) HCs to carbon dioxide ($CO_2$) and water ($H_2O$), (2) carbon monoxide (CO) to carbon dioxide ($CO_2$), and (3) the oxidation of PM (especially carbon soot) filtered from the exhaust gas.

The more important carbon soot oxidation reactions that may take place on a CSF are oxidation in oxygen:

  (1), or

  (2);

and, importantly, oxidation in nitrogen dioxide:

  (3)

Nitrogen dioxide for reaction (3) may be derived from the exhaust gas from the engine and low oxygen nitrogen oxides (including nitrogen monoxide) oxidized either on an upstream diesel oxidation catalyst (DOC) or an oxidation catalyst on the CSF.

WO-A-2014/080202 discloses a catalyzed soot filter for treating the exhaust gas of a compression ignition engine and WO-A-2014/080200 discloses exhaust systems for compression ignition engines. The documents disclose use of platinum group metal components, a support material comprising a modified alumina incorporating a heteroatom and an alkaline earth metal component.

Nitrogen dioxide is considered to have both short-term and long-term effects on health. It affects lung function and exposure enhances the response to allergens in sensitized individuals.

US-A-2003/125202 discloses a catalyst for lowering the amount of $NO_x$ in the lean exhaust gas from lean burn engines, with aluminium oxide, magnesium oxide, a platinum group metal and at least one nitrogen oxide storage material. It is essential in US-A-2003/125202 that the magnesium oxide and aluminium oxide form a homogeneous mixed oxide where the magnesium ions occupy the lattice positions of aluminium ions so the X-ray structure of the material cannot be distinguished from the X-ray structure of pure aluminium oxide.

US-A-2012/055141 discloses a catalyst for treating exhaust gas, particularly treatment of exhaust gas comprising nitrogen oxides, comprising a flow through substrate (i.e. a substantially non-filtering substrate) and a catalyst coating of two or more layers with Pt or Pd in each layer and particulate support materials, one or more oxygen storage materials and one or more nitrogen oxide storage materials.

Active and passive selective catalytic reduction (SCR) methods have been developed in an attempt generally to reduce $NO_x$ emissions by converting $NO_x$ to nitrogen and water.

Active SCR uses a reductant (for example, a nitrogenous reductant such as ammonia or urea) which is added to a stream of exhaust gas and adsorbed on to a catalyst. Usually, the nitrogenous reductant converts to ammonia and, in the presence of the SCR catalyst, a number of reactions occur, with the result that $NO_x$ is converted to elemental nitrogen and water.

Passive SCR requires no separate system to add reductant to the exhaust gas stream and may use a lean $NO_x$ trap (LNT) and a downstream selective catalytic reduction catalyst. When the exhaust gas is produced in lean conditions (low fuel/oxygen ratio), $NO_x$ is adsorbed on the LNT. The LNT is regenerated by contacting it intermittently with enriched (high fuel/oxygen ratio) exhaust gas (produced under the control of engine management systems). Such enrichment promotes desorption of adsorbed $NO_x$ and reduction of $NO_x$ on a reduction catalyst present in the LNT. The enriched exhaust gas also generates ammonia ($NH_3$) from $NO_x$, which may become adsorbed on the SCR catalyst downstream and is available for reduction of $NO_x$ that slips past the LNT in lean exhaust gas conditions. The efficiency of the SCR catalyst is dependent on the $NO_2/NO_x$ ratio with a faster reaction being promoted by a 50:50 NO2:NO mixture of $NO_x$ and on temperature.

Exhaust gas temperatures for compression ignition engines, such as diesel engines (particularly for light-duty diesel vehicles), are relatively low (e.g. up to about 400° C. during normal operating conditions). In addition, the temperatures at which diesel after treatment systems (especially for light-duty engines) are required to work are becoming lower as $CO_2$ targets for vehicles change. There is a need, therefore, for exhaust gas treatment systems to generate $NO_2$ at lower temperatures so as to provide a suitable $NO_2/NO_x$ ratio for downstream SCR catalysts. Furthermore, it is important in CSFs that the concentration of $NO_2$ is appropriate for efficient PM oxidation. There is a need, therefore, for oxidation catalysts with lower light off temperatures, especially lower light off temperatures for the NO oxidation.

It is an aim of the present invention to provide improved oxidation catalysts, especially, but not exclusively, for catalysed soot filters.

The present invention accordingly provides, in a first aspect, a catalysed soot filter comprising an oxidation catalyst for oxidizing NO to $NO_2$ and/or oxidizing CO to $CO_2$ and/or HC to $CO_2$ and $H_2O$ disposed on a wall flow filter monolithic substrate, the oxidation catalyst comprising: a platinum group metal component; and a pre-calcined support material comprising a mixed magnesium aluminium metal oxide having a magnesium content, calculated as Mg, of 15 wt % Mg or lower.

For the purposes of a possible divisional patent application, Applicants provide an alternative first aspect statement of invention, as follows:

A diesel oxidation catalyst comprising an oxidation catalyst for oxidizing NO to $NO_2$ and/or oxidizing CO to $CO_2$ and/or HC to $CO_2$ and $H_2O$ disposed on flowthrough honeycomb monolithic substrate, the oxidation catalyst comprising: a platinum group metal component; and a pre-calcined support material comprising a mixed magnesium aluminium metal oxide having a magnesium content, calculated as Mg, of 15 wt % Mg or lower. All other features of the dependent claims and corresponding description herein in connection with the catalysed soot filter first aspect apply equally to the diesel oxidation catalyst first aspect.

Preferably, the calcined support material (in particular the mixed magnesium aluminium metal oxide) has a specific surface area (as determined by nitrogen physisorption at 77 K (−196° C.)) of 250 $m^2g^{-1}$ or lower, more preferably a specific surface area of 225 $m^2g^{-1}$ or lower, and most preferably a specific surface area of 220 $m^2g^{-1}$ or lower. Preferred ranges of specific surface area as determined by nitrogen physisorption at 77 K (−196° C.) for the calcined support material (in particular the mixed magnesium aluminium metal oxide) are 10 $m^2g^{-1}$ to 250 $m^2g^{-1}$, preferably 10 $m^2g^{-1}$ to 225 $m^2g^{-1}$, more preferably 10 $m^2g^{-1}$ to 220 $m^2g^{-1}$, and most preferably 10 $m^2g^{-1}$ to 215 $m^2g^{-1}$.

A calcined support material (in particular the mixed magnesium aluminium metal oxide) has very surprisingly shown great advantages in processing properties (for example better wetting and mixing in an aqueous washcoat). Previously, it had been assumed that higher surface area (above about 250 $m^2g^{-1}$) for a support material would be more advantageous owing to the catalytic nature of the field of use.

It is also surprising and greatly advantageous, that a support material according to the invention provides for a significantly lower oxidation light off temperature, especially for the NO to $NO_2$ and/or the CO to $CO_2$ oxidation, and/or HC to $CO_2$ and $H_2O$. Preferably, therefore the catalyst is for oxidizing NO to $NO_2$ and/or oxidizing CO to $CO_2$ and/or HC to $CO_2$ and $H_2O$.

Preferably, the substrate is made or composed of a ceramic, for example cordierite ($2MgO.2Al_2O_3.5SiO_2$), silicon carbide (SiC), or a metal, for example, Fe—Cr—Al alloy, Ni—Cr—Al alloy, or a stainless steel alloy.

Preferably, the mixed magnesium aluminium metal oxide has a magnesium content, calculated as Mg, of 0.1 wt % to 15 wt % Mg, preferably of 0.1 wt % to 12 wt % Mg, more preferably of 0.1 wt % to 10 wt % Mg, even more preferably of 0.1 wt % to 9 wt % Mg, still more preferably of 1 wt % to 7 wt % Mg, most preferably of 1 wt % to 5 wt % Mg.

The calcined support material generally will have been calcined at a temperature of 700° C. or higher, preferably 750° C. or higher, more preferably 775° C. or higher, and most preferably 800° C. or higher.

It is preferred that the calcined support material comprising a mixed magnesium aluminium metal oxide comprises a magnesium deficient spinel.

Stoichiometric, natural or synthetic, magnesium aluminium spinel is of formula $MgAl_2O_4$, which corresponds to a Mg content, calculated as Mg, of 16.9 wt % (and which corresponds when calculated as MgO in a mixed magnesium oxide/aluminium oxide $MgO/Al_2O_3$ to 28 wt %). It has been known to use mixed magnesium oxide/aluminium oxide as supports in some catalyst systems. However, it has previously been thought that magnesium oxide and aluminium oxide form a homogeneous mixed oxide where the magnesium ions occupy the lattice positions of aluminium ions so the X-ray structure of the material cannot be distinguished from the X-ray structure of pure aluminium oxide (see for example US-A-2003/125202 discussed above).

In contrast to the assumption in the prior art, mixed magnesium aluminium metal oxide of the magnesium deficient spinel structure has proven in this invention to surprisingly exhibit significant improvements in NO oxidation, especially by increasing $NO_2/NO$ ratio at relative lower temperature. This is greatly advantageous because it enables efficient use of such catalysts at lower temperature, especially as the temperatures at which light duty diesel aftertreatment systems are required to work are becoming lower. This enables the same amount of $NO_2$ generation at lower temperature and therefore creates a more suitable $NO_2/NO_x$ ratio for optional downstream SCR catalysts. This significantly improves the overall efficiency of the $NO_x$ reduction over a wider temperature window than available at present. Additionally, or alternatively, it may enable the same NO oxidation performance at lower PGM loading. Calcination of the support material comprising the mixed magnesium aluminium metal oxide surprisingly tends to promote the formation of the magnesium deficient spinel structure.

It is preferred that the support material does not comprise significant amounts of manganese. It is also preferred that the support material does not comprise significant amounts of lanthanum. It is preferred that the support material comprises substantially no Mn and/or substantially no La. By substantially no Mn or La, what is meant is that the support material comprises 0.1 wt % or lower, preferably 0.05 wt % or lower.

The support material is preferably a particulate support material. The support material may have a $d_{90}$ particle size of 20 μm or lower (as determined by conventional laser diffraction techniques). The particle size distribution of the support material is generally selected to aid adhesion to the substrate. The appropriate particle size may be obtained by milling.

The monolithic substrate comprises a wall-flow monolithic substrate. Wall-flow monolithic substrates are made of ceramics of higher and more precisely controlled porosity than e.g. flow through monoliths, and adjacent channels in the wall-flow filters are alternatively plugged at each end, thus forcing the gas to flow through the porous walls which act as a filter medium. A wall flow monolithic substrate usually comprises an inlet end, an outlet end, with an axial length extending between the inlet end and the outlet end, and a plurality of channels defined by internal walls of the wall-flow substrate. The channels of the wall-flow filter are alternately blocked from either the inlet or outlet end so that the channels comprise inlet channels having an open inlet end and a closed outlet end and outlet channels having a closed inlet end and open outlet end. This ensures that the exhaust gas stream enters a channel from the inlet end, flows through the porous channel walls, and exits the filter from a different channel leading to the outlet end. Particulates in the exhaust gas stream are effectively trapped in the filter. Thus, a great advantage of the use of a wall flow monolithic substrate is that the substrate acts as a filter substrate reducing particulate emissions very effectively.

In principle, the monolithic substrate may be of any shape or size. However, the shape and size of the filtering substrate will usually be selected to optimise exposure of the catalytically active materials in the catalyst to the exhaust gas.

The porosity of the wall flow monolithic substrate is preferably 40% or greater, preferably 45% or greater, more preferably 50% or greater, and most preferably 55% or greater.

This is advantageous because such relatively high porosities enable good exhaust gas flow through the channel walls in the monolithic substrate without increasing back pressure unacceptably.

Preferably, the pores of the wall flow monolithic substrate have a mean diameter in the range 10 μm to 25 μm (as determined by mercury porosimetry). This range of pore diameter is advantageous and is also suitable for washcoat coating by which the catalysts and supports may be applied to the walls of the channels, enabling a relatively high surface area for catalytic activity without increasing back pressure unacceptably.

The wall flow monolithic substrate will usually comprise inlet channels at the inlet end thereof and outlet channels at the outlet end thereof and preferably the oxidation catalyst is disposed on or in at least the walls of the inlet channels. Generally, in filter monoliths a coating adheres in-wall as well as on-wall.

The oxidation catalyst may comprise a plurality of layers (e.g. 2, 3 or 4 layers) disposed on the substrate. Preferably, however, the oxidation catalyst comprises a single layer disposed on the substrate, more preferably the oxidation catalyst comprises a single layer on or in inlet channels thereof and/or a single layer on or in outlet channels.

The oxidation catalyst may be disposed on the filtering monolithic substrate so that it extends over substantially the whole, or alternatively, between 10% and 90% of the axial length of the filtering monolithic substrate.

The platinum group metal component may comprise one or more of platinum, palladium, rhodium, or mixtures thereof. Preferably, however, the platinum group metal component comprises a mixture of platinum and palladium, more preferably in a Pt:Pd weight ratio in the range 20:1 to 2:1, preferably 15:1 to 5:1, more preferably 12:1 to 8:1.

It is preferred that the total platinum group metal loading in the oxidation catalyst is in the range 5 to 50 $gft^{-3}$, more preferably in the range in the range 10 to 40 $gft^{-3}$, even more preferably in the range 12 to 30 $gft^{-3}$, and most preferably in the range 15 to 25 $gft^{-3}$.

Preferably, the washcoat loading of the oxidation catalyst is in the range 0.1 to 2.0 $gin^{-3}$, more preferably 0.1 to 1.5 $gin^{-3}$, even more preferably 0.1 to 1.0 $gin^{-3}$ and most preferably 0.1 to 0.8 $gin^{-3}$.

In a second aspect, the present invention accordingly provides, an exhaust system for an internal combustion engine, preferably a compression ignition engine, the exhaust system comprising a catalysed soot filter according to the first aspect of the invention.

The exhaust system will preferably further comprise other catalysts that may be disposed on the filtering monolithic substrate (e.g. on other parts of the filter substrate) or on separate and distinct other monolithic catalyst substrates (preferably flow-through monolithic substrates).

Thus, the oxidation catalyst can be in a zone disposed on the wall flow filter monolithic substrate and the wall flow filter monolithic substrate can comprise an active or a passive selective catalytic reduction catalyst in a zone downstream of the oxidation zone. Alternatively, the exhaust system can comprise an active or a passive selective catalytic reduction catalyst on a separate substrate monolith downstream of the catalysed soot filter.

The selective catalytic reduction catalyst may, preferably, comprise a metal selected from the group consisting of at least one of Cu, Hf, La, Au, In, V, lanthanides and Group VIII transition metals, such as Fe, which metal is supported on a refractory oxide or molecular sieve. Particularly preferred metals are Ce, Fe and Cu and combinations of any two or more thereof. Most preferably, the SCR catalysts comprises at least one molecular sieve and a source of copper or a source of iron.

The at least one molecular sieve may be an aluminosilicate zeolite or a SAPO. The at least one molecular sieve may be a small, a medium or a large pore molecular sieve, for example. By "small pore molecular sieve" herein is meant molecular sieves containing a maximum ring size of 8, such as CHA, AEI, ERI or LEV; by "medium pore molecular sieve" herein is meant a molecular sieve containing a maximum ring size of 10, such as ZSM-5; and by "large pore molecular sieve" herein is meant a molecular sieve having a maximum ring size of 12, such as beta. Small pore molecular sieves are often advantageous for use in SCR catalysts.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

If the exhaust system further comprises an active SCR portion, it is preferred that the exhaust system further comprises an injector for injecting a nitrogenous reductant into the exhaust gas upstream of the selective catalytic reduction zone.

Thus, a nitrogenous reductant injector may be arranged between the catalysed soot filter (CSF) substrate and a substrate comprising the selective catalytic reduction (SCR) catalyst. The nitrogenous reductant may be, for example, ammonia or a precursor thereof, preferably urea (e.g. in aqueous solution).

The exhaust system preferably further comprises a diesel oxidation catalyst zone upstream of the filtering monolithic substrate.

Preferably, the diesel oxidation catalyst is disposed on a flow-through monolithic substrate.

A flow-through monolith typically comprises a honeycomb monolith substrate (e.g. a metal or ceramic honeycomb monolith) having a plurality of channels extending therethrough, which channels are open at both ends.

An exhaust system according to the present invention, therefore, preferably comprises a diesel oxidation catalyst (DOC) disposed on a separate flow-through substrate monolith, which is disposed upstream of the wall flow monolithic substrate/catalysed soot filter. Thus, an outlet of the diesel oxidation catalyst is connected to an inlet of the catalysed soot filter of the invention.

A particularly preferred exhaust system according to the invention comprises a DOC, an oxidation catalyst disposed on a wall flow monolithic substrate/catalysed soot filter (according to the first aspect of the invention) and a selective catalytic reduction (SCR) catalyst. Such an arrangement may be called a DOC/CSF/SCR and can be for use in a heavy duty diesel vehicle or a light duty diesel vehicle, preferably an exhaust system for a light-duty diesel vehicle.

The exhaust system may further comprise a lean $NO_x$ trap catalyst. The oxidation catalyst can be in a zone disposed on the wall flow filter monolithic substrate, which wall flow filter monolithic substrate comprises a lean $NO_x$ trap catalyst in a zone downstream of the oxidation zone. Alternatively, a lean NOx trap catalyst on a separate substrate monolith can be located upstream or downstream of the catalysed soot filter.

In a third aspect, the present invention accordingly provides a vehicle comprising an internal combustion engine, preferably a compression ignition engine, and an exhaust system according to the second aspect of the invention.

The compression ignition engine may be a homogenous charge compression ignition (HCCI) engine or a premixed charge compression ignition engine (PCCI) or more conventional Port Fuel injected-type compression ignition engines.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of <8,500 pounds (US lbs.). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs.), as defined in US legislation.

In a fourth aspect, the invention provides, a method of treating exhaust gases from an internal combustion engine, preferably a compression ignition engine, the method comprising flowing the exhaust gases through a catalytic monolith as discussed in the first aspect. It is preferred if the method is for oxidising NO to $NO_2$ and/or CO to $CO_2$ and/or HC to $CO_2$ and $H_2O$.

In a fifth aspect, the present invention provides, a method of making a catalysed soot filter, the method comprising providing a calcined support material component comprising a mixed magnesium aluminium metal oxide having a magnesium content, calculated as Mg, of 15 wt % Mg or lower, preparing a washcoat comprising a platinum group metal component and the calcined support material component, and applying the washcoat to a wall flow filter monolithic substrate.

As discussed in relation to the first aspect, preferably, the support material has been calcined at a temperature of 700° C. or higher, preferably 750° C. or higher, more preferably 775° C. or higher, and most preferably 800° C. or higher.

Also, as discussed in relation to the first aspect, it is advantageous if the calcined support material (and in particular the mixed magnesium aluminium metal oxide) has a specific surface area of 250 $m^2g^{-1}$ or lower.

A general process for preparing the monolith substrate using a washcoat procedure is set out below. It will be understood that the process below can be varied and still fall within the scope of the invention.

Washcoating is preferably performed by slurrying (e.g. in water) solid particles making up the support so that they have a particle size of less than 20 μm in an average diameter or as $d_{90}$. The slurry preferably contains between 4 to 40 weight percent solids, more preferably between 6 to 30 weight percent solids. Additional components, such as stabilizers or promoters may also be incorporated in the slurry as a mixture of water soluble or water-dispersible compounds or complexes. The substrate may then be coated one or more times with the slurry such that there will be deposited on the substrate the desired loading of catalytic materials.

The platinum group metal may be added to the support-coated substrate monolith by any known means, including impregnation, adsorption, or ion-exchange of a platinum compound (such as platinum nitrate), but is conveniently added to the washcoat slurry as a soluble platinum group metal salt or salts.

The above and other characteristics, features and advantages of the present invention will become apparent from the following detailed description, taken in conjunction with the accompanying drawings and the Examples, which illustrate, the principles of the invention.

Reference throughout this specification to "an aspect" means that a particular feature, structure or characteristic described in connection with the aspect is included in at least one aspect of the present invention. Thus, appearances of the phrase "in an aspect" in various places throughout this specification are not necessarily all referring to the same aspect, but may refer to different aspects. Furthermore, the particular features, structures or characteristics of any aspect of the invention may be combined in any suitable manner, as would be apparent to one of ordinary skill in the art from this disclosure, in one or more aspects.

In the description provided herein, numerous specific details are set forth. However, it is to be understood that the invention may be practised without these specific details. In other instances, well-known methods, structures and techniques have not been shown in detail in order not to obscure an understanding of this description.

For the avoidance of any doubt, the entire contents of all prior art documents cited herein is incorporated herein by reference.

In order that the present invention may be better understood, reference is made to the accompanying drawings, in which.

Figure 1:
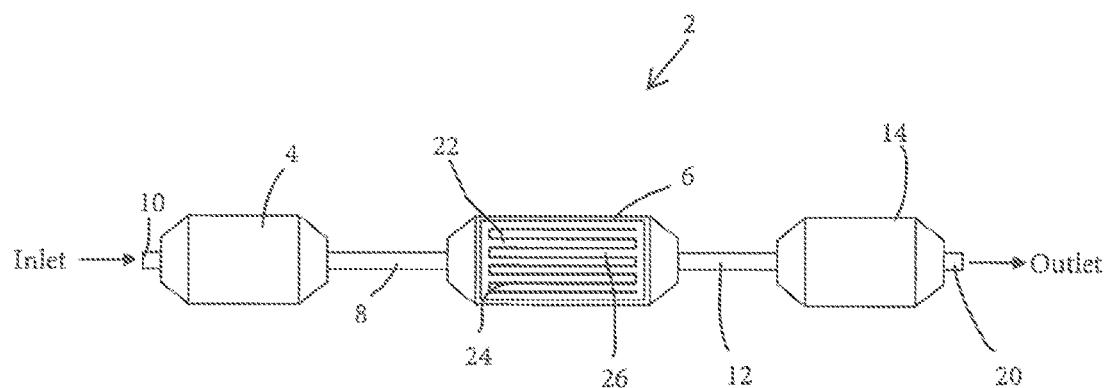
FIG. 1 illustrates schematically an exhaust system for a compression ignition (diesel) engine.

FIG. 1 shows schematically an exhaust system 2 of the present invention. The exhaust system 2 comprises a first monolithic flow through honeycomb substrate 4 coated with a diesel oxidation catalyst (DOC). The exhaust gases from the engine (not shown) upstream of the first monolithic substrate/DOC 4 enter the first monolithic honeycomb substrate 4 through inlet 10 and exit the first monolithic substrate 4 through first conduit 8. The exhaust gases then enter a second monolithic substrate 6 before exiting through second conduit 12, entering a third monolithic substrate 14 before exiting through outlet 20. Downstream of outlet 20 there may be other catalytic zones or the exhaust gases may be released to atmosphere.

The second monolithic substrate 6 is a wall flow monolith filter substrate having a honeycomb structure with many small, parallel thin-walled channels running axially through the substrate, with the channels of the wall flow substrate being alternately blocked, which allows the exhaust gas stream to enter an inlet channel 22 from the inlet, then flow through the porous channel walls, and exit the filter from an outlet channel 26 leading to the outlet. The second monolithic substrate 6 contains an oxidation catalyst 24 comprising a catalytic composition as indicated in Example 1, below, according to the invention provided on the walls of the inlet channels 22 of the second monolithic substrate 6. Thus, the second monolithic substrate 6 is a catalysed soot filter (CSF)

The third monolithic substrate 14 is a flow through honeycomb substrate with a selective catalytic reduction (SCR) catalyst provided on the walls of the channels of the substrate.

Figure 2:
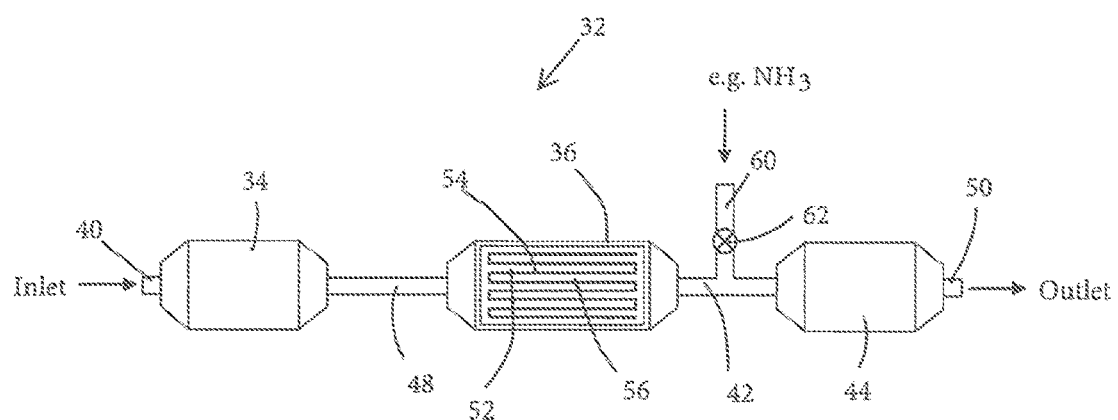
FIG. 2 illustrates schematically an exhaust system for a compression ignition (diesel) engine.

FIG. 2 shows schematically an exhaust system 32 of the present invention. The exhaust system 32 comprises a first, flow through, monolithic honeycomb substrate 34 coated with a diesel oxidation catalyst (DOC). As in FIG. 1, the exhaust gases from the engine (not shown) upstream of the first monolithic substrate/DOC 34 enter the first monolithic substrate 34 through inlet 40 and exit the first monolithic substrate 34 through first conduit 48. The exhaust gases then enter a second monolithic substrate 36 before exiting through second conduit 42, which is attached to a nitrogenous reductant injection system 60, and then to a third monolithic substrate 44 and then through outlet 50. Downstream of outlet 50 there may be other catalytic zones or the exhaust gases may be released to atmosphere.

Generally as in FIG. 1, the second monolithic substrate 36 is a filter, wall flow monolith substrate having a honeycomb structure with many small, parallel thin-walled channels running axially through the substrate, with the channels of the wall flow substrate being alternately blocked, which allows the exhaust gas stream to enter an inlet channel 52 from the inlet, then flow through the porous channel walls, and exit the filter from a different outlet channel 56 leading to the outlet. The second monolithic substrate 36 contains an oxidation catalyst 54 comprising a catalytic composition as indicated in the Example, below, according to the invention provided on the walls of the inlet channels 52 of the second monolithic substrate 36. Thus, the second monolithic substrate 36 is a catalysed soot filter (CSF).

Leading into the second conduit 42 is a connection through valve 62 to an injector system 60 for injecting a nitrogenous reductant (e.g. urea or ammonia) into the exhaust gas stream. The third monolithic substrate 44 is a flow through honeycomb substrate with a SCR catalyst (for example Fe/beta zeolite) provided on the walls of the channels of the substrate.

The invention is further illustrated by the following Examples, which are provided by way of illustration only.

COMPARATIVE EXAMPLE

Silica-alumina powder was slurried in water and milled to a $d_{90}$<8 μm. Soluble platinum and palladium salts were added and the slurry stirred to homogenise. The resulting washcoat was applied to a 3.0 liter silicon carbide wall-flow filter substrate with 42% porosity having 300 cells per square inch and wall thickness of 12 thousands of an inch using established coating techniques. The filter was then dried and calcined at 500° C. The resulting catalysed soot filter had a total PGM loading of 20 g ft$^{-3}$ and a Pt:Pd weight ratio of 10:1. The coating loading was 0.3 g in$^{-3}$.

EXAMPLE 1

Magnesium-alumina powder comprising 3 wt % magnesium was calcined at 850° C. for 3 hours then slurried in water and milled to a $d_{90}$<8 micron. Soluble platinum and palladium salts were added and the slurry stirred to homogenise. The resulting washcoat was applied to a 3.0 liter silicon carbide wall-flow filter substrate with 42% porosity having 300 cells per square inch and wall thickness of 12 thousands of an inch using established coating techniques. The filter was then dried and calcined at 500° C. The resulting catalysed soot filter had a total PGM loading of 20 g ft$^{-3}$ and a Pt:Pd weight ratio of 10:1. The coating loading was 0.3 g in$^{-3}$.

Characterisation of Support Material

Nitrogen physisorption (at −196° C.) was used to determine the specific surface area and pore characteristics of samples of the support material in the Examples.

Table 2, below, indicates the surface area (N$_2$), total pore volume and average pore diameter as determined for a fresh support material (uncalcined) of magnesium-alumina powder comprising 3 wt % magnesium ("M3"), and the same material after calcination at 850° C. for 4 hours.

X-ray diffraction (XRD) analysis refers to a technique for identifying crystalline materials. XRD patterns were measured on a PANalytical EMPYREAN powder diffractometer using Cu K-alpha radiation in the 2-theta range of about 10°-90°. The resulting diffraction patterns are analysed by comparison to known references in the International Centre for Diffraction Data pdf4+ database.

EXAMPLE 2

A powder XRD sample was prepared using a magnesium-alumina sample containing 3 wt % Mg in its fresh condition. The XRD pattern of this sample is shown in FIG. 3.

EXAMPLE 3

Figure 4:
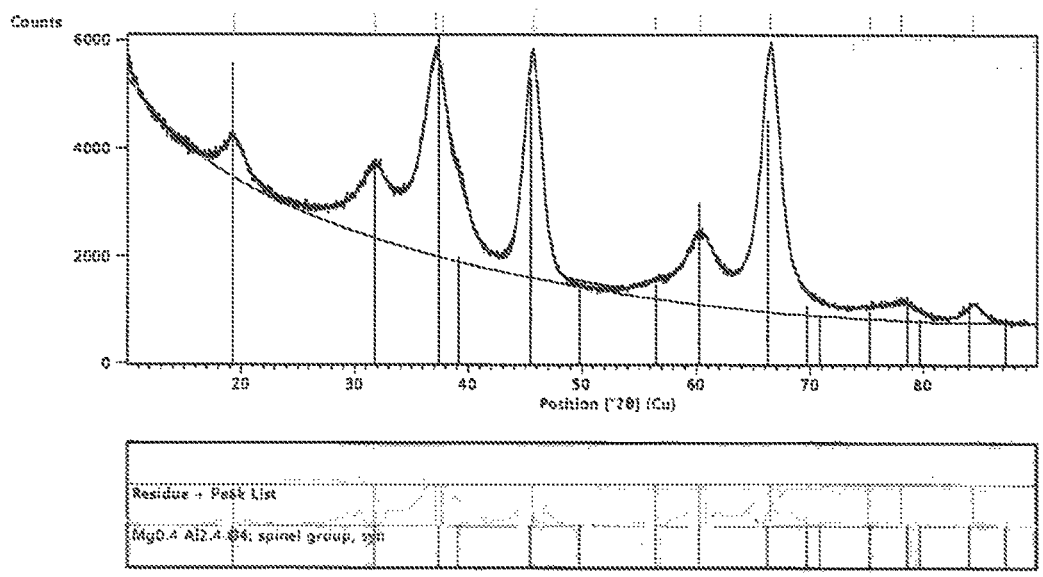
FIG. 4 is a powder XRD pattern of a magnesium-alumina sample containing 3 wt % Mg after calcination/ageing in an oven at 810° C. for 2 hours as discussed in Example 3.

A powder XRD sample was prepared using a magnesium-alumina sample containing 3 wt % Mg after calcination/ageing in an oven at 810° C. for 2 hours. The XRD pattern is shown in FIG. 4.

Figure 3:
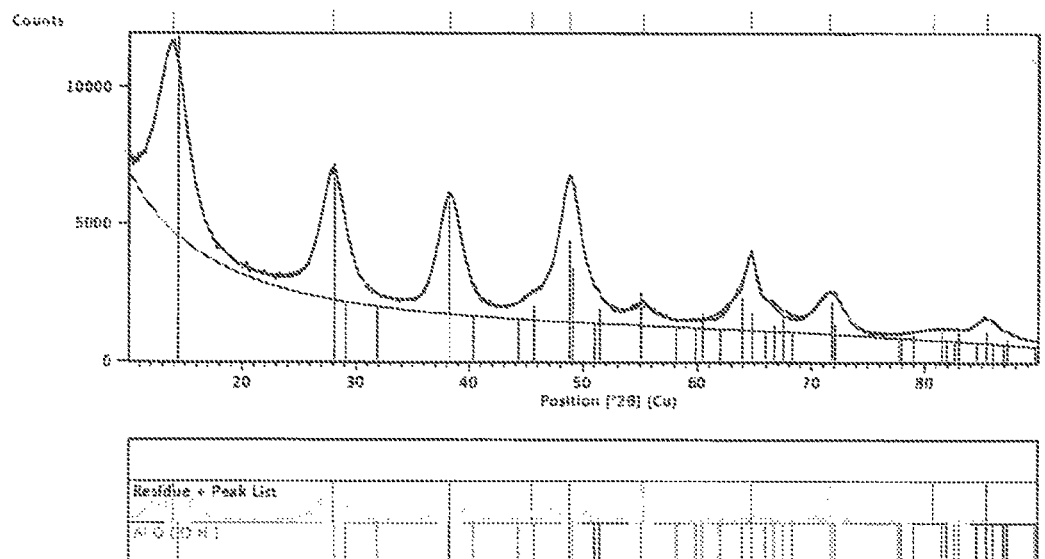
FIG. 3 is a powder XRD pattern of a magnesium-alumina sample containing 3 wt % Mg in its fresh condition as discussed in Example 2.

In FIG. 3 the XRD pattern for Example 2 shows peaks assigned to boehmite (AlO(OH)). No peaks are assigned to a Mg spinel material. In FIG. 4, the XRD pattern for Example 3 shows peaks assigned to a Mg deficient spinel group $Mg_{0.4}Al_{2.4}O_4$. The material as in Example 3 is thus magnesium deficient.

Oxidation Performance

The catalyst Comparative Example and Example 1 were hydrothermally aged (with water) in an oven at 800° C. for 16 hours. They were fitted to a 2.0 liter turbo charged diesel bench mounted engine. The catalytic activity was tested by stepwise increasing the load on the engine to increase the exhaust gas temperature. Concentrations of the exhaust gas pollutants were measured both pre- and post-catalyst. The oxidation activity for CO and HC is determined by the light off temperature whereby 50% conversion is achieved (T50). The NO oxidation activity is determined as the percentage conversion at 270° C. Activity results for the Comparative Example and Example 1 is reported in table 1.

TABLE 1

| | NO oxidation performance at 270° C. ($NO_2/NO_x$ %) | T50 CO light off (° C.) | T50 HC light off (° C.) |
|---|---|---|---|
| Comparative Example | 23 | 229 | 244 |
| Example 1 | 33 | 224 | 237 |

Results in table 1 show that the NO oxidation activity of Example 1 is greater than that of the Comparative Example. Example 1 comprises the magnesium-alumina support material. The magnesium deficient spinel structure used in Example 1 shows improved NO oxidation performance. Example 1 also has a lower T50 light off temperature for CO and HC than the Comparative Example. Example 1 comprises the magnesium deficient spinel and has improved CO and HC activity.

TABLE 2

| Material | Surface Area ($m^2/g$) (Nitrogen adsorption) | Total Pore Volume ($cm^3/g$) | Average Pore Diameter (nm) |
|---|---|---|---|
| M3 (fresh) | 408 | 0.549 | 5.4 |
| M3 (calcined) | 207 | 0.553 | 10.7 |

The invention claimed is:

1. A catalysed soot filter comprising an oxidation catalyst for oxidizing NO to $NO_2$ and/or oxidizing CO to $CO_2$ and/or HC to $CO_2$ and $H_2O$ disposed on a wall flow filter monolithic substrate, the oxidation catalyst comprising:
   a platinum group metal component, and
   a pre-calcined support material comprising a mixed magnesium aluminum metal oxide having a magnesium content, calculated as Mg, of
   15 wt % Mg or lower, wherein the pre-calcined support material comprising a
   mixed magnesium aluminum metal oxide comprises a magnesium deficient spinel.

2. A catalysed soot filter according to claim 1, wherein the pre-calcined support material has a specific surface area of 250 $m^2g^{-1}$ or lower.

3. A catalysed soot filter according to claim 1, wherein the mixed magnesium aluminum metal oxide has a magnesium content, calculated as Mg, of 0.1 wt % to 12 wt % Mg.

4. A catalysed soot filter according to claim 1, wherein the porosity of the wall flow filter monolithic substrate is 40% or greater.

5. A catalysed soot filter according to claim 1, wherein the pores of the wall flow filter monolithic substrate have a mean diameter in the range 10 μm to 25 μm.

6. A catalysed soot filter according to claim 1, wherein the wall flow filter monolithic substrate comprises inlet channels at the inlet end thereof and outlet channels at the outlet end thereof and wherein the oxidation catalyst is disposed on or in at least the walls of the inlet channels.

7. A catalysed soot filter according to claim 1, wherein the oxidation catalyst is disposed on the wall flow filter monolithic substrate so that it extends over between 10% and 90% of the axial length of the filtering monolithic substrate.

8. A catalysed soot filter according to claim 1, wherein the platinum group metal component comprises platinum, palladium, rhodium, or mixtures of any two or more thereof.

9. A catalysed soot filter according to claim 1, wherein the platinum group metal component comprises a mixture of platinum and palladium in a Pt:Pd weight ratio in the range 20:1 to 2:1.

10. A catalysed soot filter according to claim 1, wherein the total platinum group metal loading in the oxidation catalyst is in the range 5 to 50 $gft^{-3}$.

11. A catalysed soot filter according to claim 1, wherein the washcoat loading of the oxidation catalyst is in the range 0.1 to 2.0 $gin^{-3}$.

12. An exhaust system for an internal combustion engine, the exhaust system comprising a catalysed soot filter according to claim 1.

13. An exhaust system according to claim 12, wherein the oxidation catalyst is in a zone disposed on the wall flow filter monolithic substrate, the wall flow filter monolithic substrate comprising an active or a passive selective catalytic reduction catalyst in a zone downstream of the oxidation zone.

14. An exhaust system according to claim 12, comprising an active or a passive selective catalytic reduction catalyst on a separate substrate monolith downstream of the catalysed soot filter.

15. An exhaust system according to claim 12, wherein the selective catalytic reduction catalyst comprises a molecular sieve and a copper or an iron promoter.

16. An exhaust system according to claim 12 comprising a separate monolithic substrate comprising a diesel oxidation catalyst upstream of the catalysed soot filter.

17. An exhaust system according to claim 16, wherein the diesel oxidation catalyst is disposed on a flow through honeycomb monolithic substrate.

18. An exhaust system according to claim 12 wherein the oxidation catalyst is in a zone disposed on the wall flow filter monolithic substrate, which wall flow filter monolithic substrate comprising a lean $NO_x$ trap catalyst in a zone upstream or downstream of the oxidation zone.

19. A vehicle comprising an internal combustion engine and an exhaust system according to claim 12.

20. A method of treating exhaust gases from an internal combustion engine comprising flowing the exhaust gases through a catalysed soot filter according to claim 1.

21. A method of making a catalytic monolith, the method comprising
   providing a calcined support material component comprising a mixed magnesium aluminum metal oxide having a magnesium content, calculated as Mg, of 15 wt % Mg or lower,
   preparing a washcoat comprising a platinum group metal component and the calcined support material component, and
   applying the washcoat to a wall flow monolithic substrate.

* * * * *